(12) United States Patent
Wang et al.

(10) Patent No.: US 12,725,997 B2
(45) Date of Patent: Sep. 1, 2026

(54) OPTICAL FIBER BASED OPTICAL RADIATION MODULATION DEVICE

(71) Applicant: City University of Hong Kong, Kowloon (HK)

(72) Inventors: Lidai Wang, Kowloon (HK); Jiangbo Chen, Kowloon (HK)

(73) Assignee: City University of Hong Kong, Kowloon (HK)

( * ) Notice: Subject to any disclaimer, the term of this patent is extended or adjusted under 35 U.S.C. 154(b) by 727 days.

(21) Appl. No.: 18/325,403

(22) Filed: May 30, 2023

(65) Prior Publication Data

US 2024/0405504 A1 Dec. 5, 2024

(51) Int. Cl.
*H01S 3/30* (2006.01)
*G01N 29/24* (2006.01)

(52) U.S. Cl.
CPC ......... *H01S 3/302* (2013.01); *G01N 29/2418* (2013.01); *G02F 2203/15* (2013.01); *G02F 2203/56* (2013.01)

(58) Field of Classification Search
CPC .. G02F 2203/15; G02F 2203/56; H01S 3/302; G01N 29/2418
See application file for complete search history.

(56) References Cited

U.S. PATENT DOCUMENTS 6,807,338 B2 * 10/2004 Bouteiller ............... H01S 3/302 385/10
8,588,556 B1 * 11/2013 Dong ................... H04B 10/541 385/32
8,976,446 B2 * 3/2015 Johnson .................. H01S 3/302 372/6
10,985,841 B1 * 4/2021 Seyedi ................. H04B 10/516
11,914,268 B2 * 2/2024 Gui ........................ G02F 1/3511
2013/0094806 A1 * 4/2013 Lessard ............. H04B 10/2581 385/28
2018/0303349 A1 10/2018 Wang et al.
2023/0072926 A1 * 3/2023 Morrison ............. G02B 6/4202

OTHER PUBLICATIONS

Sharma et al., "Demonstration of optical frequency comb generation using four-wave mixing in highly nonlinear fiber", Sep. 2021, Optik, vol. 241, pp. 1-11, found at https://doi.org/10.1016/j.ijleo.2021.166948 (Year: 2021).*

(Continued)

*Primary Examiner* — Daniel Petkovsek
(74) *Attorney, Agent, or Firm* — Renner, Kenner, Greive, Bobak, Taylor & Weber

(57) ABSTRACT

An optical radiation modulation device that includes two or more optical fibers arranged optically in parallel, a first coupler coupled with the optical fibers, and a second coupler coupled with the optical fibers. The first coupler is operable to receive a single-wavelength optical radiation and to provide or distribute the single-wavelength optical radiation to the optical fibers. The second coupler is operable to receive optical radiations outputted by the optical fibers. The optical fibers include, at least: a first optical fiber operable to modulate the single-wavelength optical radiation provided or distributed to the first optical fiber to generate a multi-wavelength optical radiation for output to the second coupler; and a second optical fiber.

26 Claims, 10 Drawing Sheets

(56) References Cited

OTHER PUBLICATIONS

J. Yao, L. V. Wang, Sensitivity of photoacoustic microscopy, Photoacoustics. 2 (2014) 87-101. https://doi.org/10.1016/j.pacs.2014.04.002.
J. Yao, L. V Wang, Photoacoustic microscopy, 778 (2013) 758-778. https://doi.org/10.1002/lpor.201200060.
J. Yao, L. Wang, J. Yang, K.I. Maslov, T.T.W. Wong, L. Li, C. Huang, J. Zou, L. V. Wang, High-speed label-free functional photoacoustic microscopy of mouse brain in action, Nat. Methods. (2015) 1-7. https://doi.org/10.1038/nmeth.3336.
C. Taboada, J. Delia, M. Chen, C. Ma, X. Peng, X. Zhu, L. Jiang, T. Vu, Q. Zhou, J. Yao, S. Johnsen, Glassfrogs conceal blood in their liver to maintain transparency, Science 378. 1315-1320 (2022). https://doi.org/10.1126/science.abl6620.
X. Zhu, Q. Huang, A. DiSpirito, T. Vu, Q. Rong, X. Peng, H. Sheng, X. Shen, Q. Zhou, L. Jiang, U. Hoffmann, J. Yao, Real-time whole-brain imaging of hemodynamics and oxygenation at micro-vessel resolution with ultrafast wide-field photoacoustic microscopy, Light Sci. Appl. 11 (2022) 138. https://doi.org/10.1038/s41377-022-00836-2.
Y. Liang, L. Jin, B. Guan, L. Wang, 2 MHz multi-wavelength pulsed laser for functional photoacoustic microscopy, 42 (2017) 1452-1455.
R. Cao, J. Li, B. Ning, N. Sun, T. Wang, Z. Zuo, S. Hu, Functional and oxygen-metabolic photoacoustic microscopy of the awake mouse brain, Neuroimage. 150 (2017) 77-87. https://doi.org/10.1016/j.neuroimage.2017.01.049.
R. Cao, A. Tran, J. Li, Z. Xu, N. Sun, Z. Zuo, S. Hu, Hemodynamic and oxygen-metabolic responses of the awake mouse brain to hypercapnia revealed by multi-parametric photoacoustic microscopy, J. Cereb. Blood Flow Metab. 41 (2021) 2628-2639. https://doi.org/10.1177/0271678X211010352.
C. Liu, Y. Liang, L. Wang, Photoacoustics Single-shot photoacoustic microscopy of hemoglobin concentration, oxygen saturation, and blood flow in sub-microseconds, Photoacoustics. 17 (2020) 100156. https://doi.org/10.1016/j.pacs.2019.100156.
J. Park, B. Park, T.Y. Kim, S. Jung, W.J. Choi, J. Ahn, D.H. Yoon, J. Kim, S. Jeon, D. Lee, U. Yong, J. Jang, W.J. Kim, H.K. Kim, U. Jeong, H.H. Kim, C. Kim, Quadruple ultrasound, photoacoustic, optical coherence, and fluorescence fusion imaging with a transparent ultrasound transducer, Proc. Natl. Acad. Sci. U. S. A. 118 (2021) 1-12. https://doi.org/10.1073/pnas.1920879118.
L. Li, J. Xia, G. Li, A. Garcia-Uribe, Q. Sheng, M.A. Anastasio, L. V. Wang, Label-free photoacoustic tomography of whole mouse brain structures ex vivo, Neurophotonics. 3 (2016) 1. https://doi.org/10.1117/1.nph.3.3.035001.
L. Lin, P. Hu, J. Shi, C.M. Appleton, K. Maslov, L. Li, R. Zhang, L. V. Wang, Single-breath-hold photoacoustic computed tomography of the breast, Nat. Commun. 9 (2018) 2352. https://doi.org/10.1038/s41467-018-04576-z.
L. Li, L. Zhu, C. Ma, L. Lin, J. Yao, L. Wang, K. Maslov, R. Zhang, W. Chen, J. Shi, L. V. Wang, Single-impulse panoramic photoacoustic computed tomography of small-animal whole-body dynamics at high spatiotemporal resolution, Nat. Biomed. Eng. 1 (2017). https://doi.org/10.1038/s41551-017-0071.
S.W. Cho, S.M. Park, B. Park, D.Y. Kim, T.G. Lee, B.M. Kim, C. Kim, J. Kim, S.W. Lee, C.S. Kim, High-speed photoacoustic microscopy: A review dedicated on light sources, Photoacoustics. 24 (2021) 100291. https://doi.org/10.1016/j.pacs.2021.100291.
Y. He, J. Shi, K.I. Maslov, R. Cao, L. V. Wang, Wave of single-impulse-stimulated fast initial dip in single vessels of mouse brains imaged by high-speed functional photoacoustic microscopy, J. Biomed. Opt. 25 (2020) 1. https://doi.org/10.1117/1.jbo.25.6.066501.
J. Zhu, C. Liu, Y. Liu, J. Chen, Y. Zhang, K. Yao, L. Wang, Self-fluence-compensated functional photoacoustic microscopy, IEEE Trans. Med. Imaging. PP (2021) 1. https://doi.org/10.1109/TMI.2021.3099820.
C. Liu, J. Chen, Y. Zhang, J. Zhu, L. Wang, Five-wavelength optical-resolution photoacoustic microscopy of blood and lymphatic vessels, Adv. Photonics. 3 (2021) 1-9. https://doi.org/10.1117/1.ap.3.1.016002.

* cited by examiner 532 nm 558 nm $sO_2$
0
Normalized photoacoustic amplitude
1
0
$sO_2$
1

532 nm 558 nm $sO_2$
0
Normalized photoacoustic amplitude
1
0
$sO_2$
1

OPTICAL FIBER BASED OPTICAL RADIATION MODULATION DEVICE

TECHNICAL FIELD

The invention relates to an optical radiation modulation device that makes use of optical fibers to modulate optical radiation. The optical radiation modulation device may be used for providing optical radiation suitable for use in optical or photoacoustic imaging.

BACKGROUND

Optical radiation source that provides multi-wavelength optical radiation for optical or photoacoustic imaging is known. For example, Cho et al., "High-speed photoacoustic microscopy: A review dedicated on light sources (2021)", discloses various example optical radiation sources that can provide multi-wavelength optical radiation for photoacoustic imaging. U.S. Ser. No. 15/493,283, filed on 21 Apr. 2017, teaches a system for providing multi-wavelength laser for fast functional photoacoustic microscopy.

These existing optical radiation sources typically use numerous optical elements, such as lenses, mirrors, couplers, etc., to construct optical paths for generating the multi-wavelength optical radiation. Problematically, the use of these numerous optical elements may sometimes lead to relatively complex optical configurations, which may be relatively difficult to deploy, and may result in performance instability or reduced efficiency as the performance of some of the optical elements may be easily affected by the environment (e.g., airflow, temperature).

SUMMARY OF THE INVENTION

In a first aspect, there is provided an optical radiation modulation device. The optical radiation modulation device comprises: a plurality of optical fibers arranged optically in parallel, a first coupler coupled with the plurality of optical fibers, and a second coupler optically coupled with the plurality of optical fibers. The first coupler is operable to receive a single-wavelength optical radiation and to provide or distribute (e.g., divide) the single-wavelength optical radiation to the plurality of optical fibers. The second coupler is operable to receive or collect optical radiations outputted by the plurality of optical fibers. The plurality of optical fibers comprise a first optical fiber operable to modulate the single-wavelength optical radiation provided or distributed to the first optical fiber to generate a multi-wavelength optical radiation for output to the second coupler, and a second optical fiber. In some embodiments, the plurality of optical fibers may comprise one or more further optical fibers (third optical fiber, fourth optical fiber, fifth optical fiber, etc.). The single-wavelength optical radiation may be an optical radiation pulse, and the multi-wavelength optical radiation may be an optical radiation pulse.

Optionally, the first optical fiber is operable to generate the multi-wavelength optical radiation based on stimulated Raman scattering such that wavelengths of the multi-wavelength optical radiation comprise wavelength of the single-wavelength optical radiation and at least one Stokes wavelength. Optionally, the first optical fiber comprises a single-mode optical fiber. Optionally, the first optical fiber comprises a multi-mode optical fiber.

In some embodiments, the second optical fiber is operable to enable passage of the single-wavelength optical radiation provided or distributed to the second optical fiber, without wavelength modification, for output to the second coupler. Optionally, the first optical fiber and the second optical fiber have different optical path lengths such that the optical radiations in the two optical fibers may experience different time delays. Optionally, the multi-wavelength optical radiation outputted by the first optical fiber is a first multi-wavelength optical radiation, and the plurality of optical fibers further comprise, at least, a third optical fiber operable to modulate the single-wavelength optical radiation provided or distributed to the third optical fiber to generate a second multi-wavelength optical radiation for output to the second coupler. The first multi-wavelength optical radiation and the second multi-wavelength optical radiation may be different in terms of wavelength composition. The single-wavelength optical radiation, the first multi-wavelength optical radiation, and the second multi-wavelength optical radiation may each be an optical radiation pulse. Optionally, the third optical fiber is operable to generate the second multi-wavelength optical radiation based on stimulated Raman scattering such that wavelengths of the second multi-wavelength optical radiation comprise wavelength of the single-wavelength optical radiation and at least one Stokes wavelength. Optionally, the third optical fiber comprises a single-mode optical fiber. Optionally, the third optical fiber comprises a multi-mode optical fiber. Optionally, the first optical fiber, the second optical fiber, and the third optical fiber have different optical path lengths such that the optical radiations in the three optical fibers may experience different time delays.

In some other embodiments, the multi-wavelength optical radiation outputted by the first optical fiber is a first multi-wavelength optical radiation, and the second optical fiber is operable to modulate the single-wavelength optical radiation provided or distributed to the second optical fiber to generate a second multi-wavelength optical radiation for output to the second coupler. The first multi-wavelength optical radiation and the second multi-wavelength optical radiation may be different in terms of wavelength composition. The first multi-wavelength optical radiation and the second multi-wavelength optical radiation may each be an optical radiation pulse. Optionally, the second optical fiber is operable to generate the second multi-wavelength optical radiation based on stimulated Raman scattering such that wavelengths of the second multi-wavelength optical radiation comprise wavelength of the single-wavelength optical radiation and at least one Stokes wavelength. For example, the wavelengths of the second multi-wavelength optical radiation may include wavelengths of the first multi-wavelength optical radiation and at least one Stokes wavelength. Optionally, the second optical fiber comprises a single-mode optical fiber. Optionally, the second optical fiber comprises a multi-mode optical fiber. Optionally, the first optical fiber comprises a single-mode optical fiber or a multi-mode optical fiber operable to generate the first multi-wavelength optical radiation based on stimulated Raman scattering, the second optical fiber comprises a single-mode optical fiber or a multi-mode optical fiber operable to generate the second multi-wavelength optical radiation based on stimulated Raman scattering, and the first optical fiber and the second optical fiber have different optical path lengths such that the optical radiations in the two optical fibers may experience different time delays. Optionally, the plurality of optical fibers further comprise, at least, a third optical fiber operable to modulate the single-wavelength optical radiation provided or distributed to the third optical fiber to generate a third multi-wavelength optical radiation for output to the second coupler. Optionally, the first multi-wavelength optical radiation, the second multi-wavelength optical radiation, and the third multi-wavelength optical radiation are different from each other in terms of wavelength composition. The first multi-wavelength optical radiation, the second multi-wavelength optical radiation, and the third multi-wavelength optical radiation may each be an optical radiation pulse. Optionally, the third optical fiber is operable to generate the third multi-wavelength optical radiation based on stimulated Raman scattering such that wavelengths of the third multi-wavelength optical radiation comprise wavelength of the single-wavelength optical radiation and at least one Stokes wavelength. Optionally, the third optical fiber comprises a single-mode optical fiber. Optionally, the third optical fiber comprises a multi-mode optical fiber. Optionally, the first optical fiber comprises a single-mode optical fiber or a multi-mode optical fiber operable to generate the first multi-wavelength optical radiation based on stimulated Raman scattering, the second optical fiber comprises a single-mode optical fiber or a multi-mode optical fiber operable to generate the second multi-wavelength optical radiation based on stimulated Raman scattering, and the third optical fiber comprises a single-mode optical fiber or a multi-mode optical fiber operable to generate the third multi-wavelength optical radiation based on stimulated Raman scattering, and the first optical fiber, the second optical fiber, and the third optical fiber have different optical path lengths such that the optical radiations in the three optical fibers may experience different time delays.

Optionally, the plurality of optical fibers comprise at least two optical fibers each operable to modulate the single-wavelength optical radiation provided or distributed to it (by the first coupler) to generate a respective multi-wavelength optical radiation for output to the second coupler. The single-wavelength optical radiation and the respective multi-wavelength optical radiation may each be an optical radiation pulse. The respective multi-wavelength optical radiations generated by these at least two optical fibers may be different in terms of wavelength composition. Optionally, each of the at least two optical fibers is operable to generate respective multi-wavelength optical radiation based on stimulated Raman scattering. Optionally, these at least two optical fibers may comprise single-mode optical fibers, e.g., polarization-maintaining single-mode optical fibers, or multi-mode optical fibers. Optionally, these at least two optical fibers may have different optical path lengths such that the optical radiations in these optical fibers may experience different time delays. Optionally, the first coupler comprises a first optical fiber coupler and the second coupler comprises a second optical fiber coupler.

Optionally, the plurality of optical fibers comprise at least one optical fiber operable to enable passage of the single-wavelength optical radiation provided or distributed to it (by the first coupler), without wavelength modification, for output to the second coupler. The single-wavelength optical radiation may each be an optical radiation pulse.

Optionally, the optical radiation modulation device further comprises an input coupler optically coupled with the first coupler. The input coupler is configured to couple, e.g., removably couple, with an optical radiation generator that is operable to provide the single-wavelength optical radiation. The optical radiation generator may be a laser generator, e.g., pump laser, operable to provide the single-wavelength optical radiation. The optical radiation generator may be a pulsed laser generator operable to provide the single-wavelength optical radiation. Optionally, the input coupler is optically coupled with the first coupler via an optical fiber. The input coupler may be an optical fiber launcher.

Optionally, the optical radiation modulation device further comprises an output coupler optically coupled with the second coupler. The output coupler is configured to optically couple with an imaging device to provide the optical radiations outputted by the plurality of optical fibers to the imaging device. The imaging device may be an optical or photoacoustic imaging device. The imaging device may be an imaging probe. Optionally, the output coupler is optically coupled with the second coupler via an optical fiber. The output coupler may be an optical fiber launcher.

Optionally, the optical radiation modulation device is a laser modulation device, the single-wavelength optical radiation is single-wavelength laser, and the multi-wavelength optical radiation is multi-wavelength laser. For example, the single-wavelength optical radiation is single-wavelength laser pulse, and the multi-wavelength optical radiation is multi-wavelength laser pulse.

Optionally, the single-wavelength optical radiation is laser with a wavelength of 532 nm.

In a second aspect, there is provided an optical radiation source for optical or photoacoustic imaging. The optical radiation source includes the optical radiation modulation device of the first aspect, and an optical radiation generator optically coupled with the optical radiation modulation device and operable to provide the single-wavelength optical radiation to the optical radiation modulation device. For example, the optical radiation source may be used for photoacoustic microscopy (PAM), such as optical-resolution photoacoustic microscopy (OR-PAM). For example, the optical radiation source may be used for optical coherence tomography (OCT). For example, the optical radiation source may be used for laser scanning florescence microscopy.

Optionally, the optical radiation generator comprises a laser generator and the single-wavelength optical radiation comprises single-wavelength laser. The optical radiation generator may be a pulsed laser generator and the single-wavelength optical radiation comprises single-wavelength pulsed laser. Optionally, the laser generator is a single-wavelength laser generator that can only generate one laser wavelength. Optionally, the single-wavelength laser has a wavelength of 532 nm.

In a third aspect, there is provided a device for optical or photoacoustic imaging, comprising: an optical radiation modulation device of the first aspect and a filter arrangement optically coupled with the optical radiation modulation device to remove and/or attenuate one or more wavelengths in the optical radiations outputted by the plurality of optical fibers of the optical radiation modulation device. For example, the device may be a probe for optical or photoacoustic imaging. For example, the device may be used for photoacoustic microscopy (PAM), such as optical-resolution photoacoustic microscopy (OR-PAM). For example, the device may be used for optical coherence tomography (OCT). For example, the device may be used for laser scanning florescence microscopy.

In a fourth aspect, there is provided a device for optical or photoacoustic imaging, comprising: the optical radiation source of the second aspect, and a filter arrangement optically coupled with the optical radiation modulation device to remove and/or attenuate one or more wavelengths in the optical radiations outputted by the plurality of optical fibers of the optical radiation modulation device. For example, the device may be a probe for optical or photoacoustic imaging. For example, the device may be used for photoacoustic microscopy (PAM), such as optical-resolution photoacoustic microscopy (OR-PAM). For example, the device may be used for optical coherence tomography (OCT). For example, the device may be used for laser scanning florescence microscopy.

In a fifth aspect, there is provided an optical or photoacoustic imaging system comprising the optical radiation modulation device of the first aspect, the optical radiation source of the second aspect, the device of the third aspect, or the device of the fourth aspect. Optionally, the optical or photoacoustic imaging system comprises a system for photoacoustic microscopy (PAM), such as optical-resolution photoacoustic microscopy (OR-PAM). Optionally, the optical or photoacoustic imaging system comprises a system for optical coherence tomography (OCT). Optionally, the optical or photoacoustic imaging system comprises a system for laser scanning florescence microscopy.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

Terms of degree such that "generally", "about", "substantially", or the like, are used, depending on context, to account for manufacture tolerance, degradation, trend, tendency, imperfect practical condition(s), etc.

Unless otherwise specified, the terms "connected", "coupled", "mounted" or the like, are intended to encompass both direct and indirect connection, coupling, mounting, etc.

BRIEF DESCRIPTION OF THE DRAWINGS

Embodiments of the invention will now be described, by way of example, with reference to the accompanying drawings in which.

DETAILED DESCRIPTION

Figure 1:
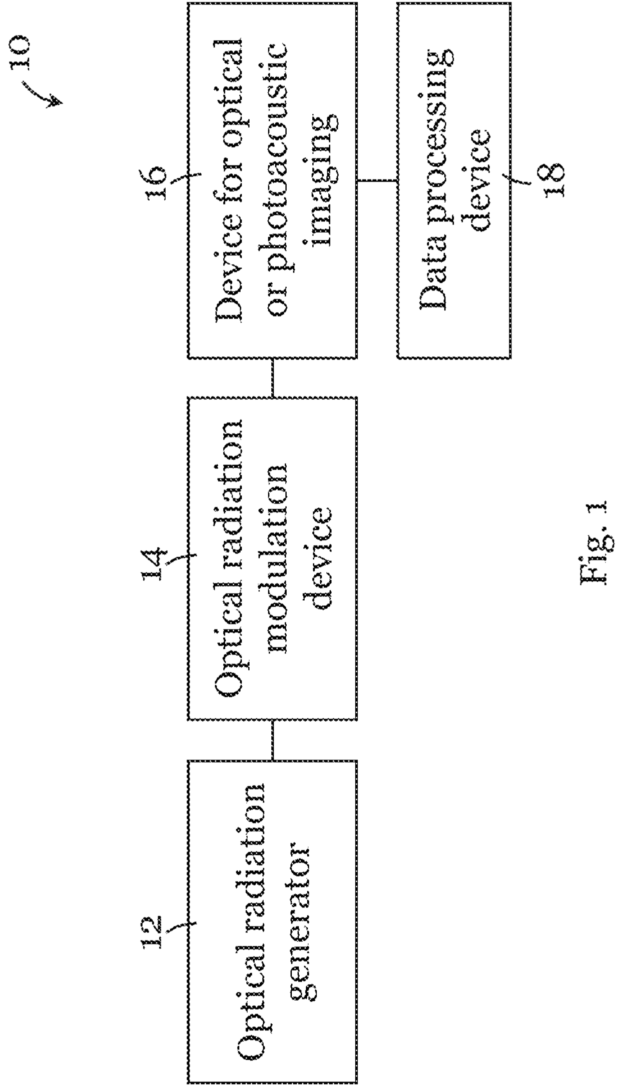
FIG. 1 is a block diagram illustrating an example optical or photoacoustic imaging system.

FIG. 1 shows an example optical or photoacoustic imaging system 10. The optical or photoacoustic imaging system 10 includes an optical radiation generator 12, an optical radiation modulation device 14, a device for optical or photoacoustic imaging 16, and a data processing device 18. The optical radiation generator 12, the optical radiation modulation device 14, and the device for optical or photoacoustic imaging 16 may be optically coupled with each other. The optical radiation generator 12 is arranged to generate optical radiation for performing optical or photoacoustic imaging. The optical radiation modulation device 14 is arranged to receive and modulate the optical radiation generated by the optical radiation generator 12 and to provide a modulated optical radiation to the device for optical or photoacoustic imaging 16. For example, the optical radiation modulation device 14 may modulate the optical radiation generated by the optical radiation generator 12 by altering one or more of the following properties of the optical radiation generated by the optical radiation generator 12: frequency content, wavelength composition, phase, amplitude, polarization, etc. The device for optical or photoacoustic imaging 16 is arranged to receive the modulated optical radiation from the optical radiation modulation device 14 and use the received modulated optical radiation to perform optical or photoacoustic imaging, e.g., on a subject (animal, human, etc.), an object (e.g., a phantom), etc. The device for optical or photoacoustic imaging 16 may or may not further modulate the modulated optical radiation provided by the optical radiation modulation device 14 before using it for imaging. In one example, the device for optical or photoacoustic imaging 16 may further modulate the modulated optical radiation provided by the optical radiation modulation device 14 by altering one or more of the following properties of the modulated optical radiation provided by the optical radiation modulation device 14:

frequency content, wavelength composition, phase, amplitude, polarization, etc. The device for optical or photoacoustic imaging 16 may include an imaging probe or head that can be moved, by machine and/or by hand, relative to the subject or object to be or being imaged. The data processing device 18 is arranged to process the data of the subject or object obtained by the device for optical or photoacoustic imaging 16, and to generate image, spectrum, or other representation associated with the subject or object. In some implementations, the optical radiation generator 12, the optical radiation modulation device 14, the device for optical or photoacoustic imaging 16, and the data processing device 18 may be separate devices operably connected with each other. In some implementations, two or more of the optical radiation generator 12, optical radiation modulation device 14, device for optical or photoacoustic imaging 16, and data processing device 18 may be integrated or combined.

In some examples, the optical or photoacoustic imaging system 10 may be a system for photoacoustic microscopy (PAM), such as optical-resolution photoacoustic microscopy (OR-PAM). In some examples, the optical or photoacoustic imaging system 10 may be a system for optical coherence tomography (OCT). In some examples, the optical or photoacoustic imaging system 10 may be a system for laser scanning florescence microscopy. In other examples, the optical or photoacoustic imaging system 10 may be other types of optical or photoacoustic imaging systems.

Figure 2:
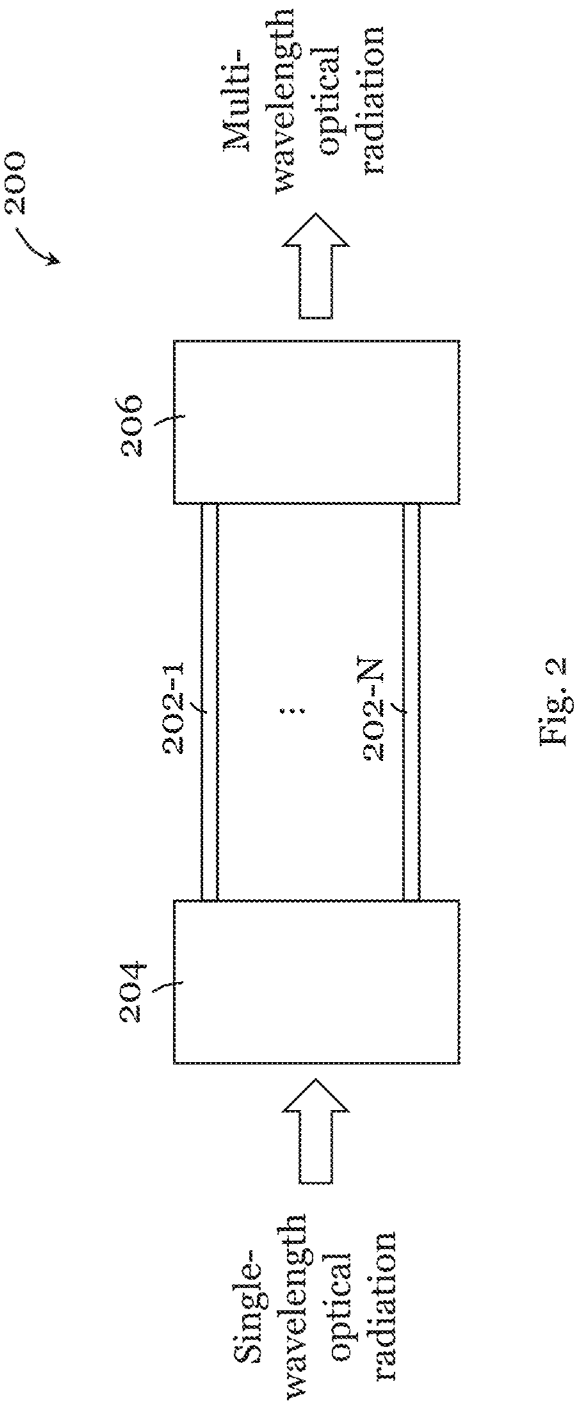
FIG. 2 is a schematic diagram illustrating an optical radiation modulation device in some embodiments of the invention.

FIG. 2 shows an optical radiation modulation device 200 in some embodiments of the invention. The optical radiation modulation device 200 may be used as part of an optical or photoacoustic imaging system such as but not limited to the optical or photoacoustic imaging system 10 of FIG. 1.

Generally, the optical radiation modulation device 200 includes N optical waveguides 202-1 to 202-N (N≥2) arranged optically in parallel between two couplers 204, 206. The optical waveguides 202-1 to 202-N are optically coupled with each of the two couplers 204, 206. Specifically one end of the optical waveguides 202-1 to 202-N is coupled with the coupler 204, and another end of the optical waveguides 202-1 to 202-N is coupled with the coupler 206. The coupler 204 is operable to receive an optical radiation and to provide or distribute (e.g., divide) the received optical radiation to the optical waveguides 202-1 to 202-N. One or more of the optical waveguides 202-1 to 202-N are operable to process or manipulate the optical radiation. The coupler 206 is operable to receive or collect optical radiations outputted by the optical waveguides 202-1 to 202-N for output. The optical radiation may be in the form of optical radiation pulse(s).

As illustrated in FIG. 2, in some embodiments, the coupler 204 is arranged to receive a single-wavelength optical radiation (e.g., pulse) and to distribute or provide it to the optical waveguides 202-1 to 202-N. The coupler 204 may control or regulate the energy or energy ratio of the single-wavelength optical radiation (e.g., pulse) distributed or provided to the optical waveguides 202-1 to 202-N. Each of the optical waveguides 202-1 to 202-N may be distributed at least part of the single-wavelength optical radiation (e.g., pulse). At least one of the optical waveguides 202-1 to 202-N is arranged to modulate the single-wavelength optical radiation provided or distributed to it to become a multi-wavelength optical radiation (e.g., pulse), which is then provided to the coupler 206. The coupler 206 is arranged to receive the outputs of the optical waveguides 202-1 to 202-N for output. The output by the coupler 206 may include at least one multi-wavelength optical radiation (e.g., pulse) and optionally at least one single wavelength optical radiation (e.g., pulse).

In some embodiments of FIG. 2, the N optical waveguides 202-1 to 202-N include N optical fibers.

The N optical fibers include: one or more optical fibers each operable to modulate the single-wavelength optical radiation (e.g., pulse) provided or distributed to it by the coupler 204 to generate a respective multi-wavelength optical radiation (e.g., pulse) for output to the coupler 206. Each of the one or more optical fibers may generate the multi-wavelength optical radiation (e.g., pulse) based on stimulated scattering such as stimulated Raman scattering. In some embodiments, each of the one or more optical fibers may generate the multi-wavelength optical radiation (e.g., pulse) based on stimulated Raman scattering (SRS) such that wavelengths of the multi-wavelength optical radiation comprise wavelength of the single-wavelength optical radiation and at least one Stokes wavelength. In embodiments with multiple ones of these optical fibers (optical fibers that can modulate the single-wavelength optical radiation to generate respective multi-wavelength optical radiation), the multi-wavelength optical radiations generated by at least two of these optical fibers may be different. For example, wavelengths of the multi-wavelength optical radiation generated by one optical fiber may include wavelengths of the multi-wavelength optical radiation generated by another optical fiber and one or more additional wavelengths. In some embodiments, each of the one or more optical fibers may include a respective single-mode optical fiber, which may be polarization-maintaining single-mode optical fibers, or multi-mode optical fiber. In embodiments with multiple ones of these optical fibers (optical fibers that can modulate the single-wavelength optical radiation to generate respective multi-wavelength optical radiation), at least two of the optical fibers may have different optical path lengths to provide different time delays to the optical radiations. In some embodiments, the N optical fibers may further include one or more optical fibers each operable to enable passage of the single-wavelength optical radiation (e.g., pulse) provided or distributed to it by the coupler 204, without wavelength modification, for output to the coupler 206. The optical path length of at least one of the optical fiber that enables passage of the single-wavelength optical radiation may be different from the optical path length of at least one of the optical fiber that can modulate the single-wavelength optical radiation to generate multi-wavelength optical radiation to provide different time delays to the optical radiations. In embodiments with multiple ones of these optical fibers (optical fibers that enable passage of the single-wavelength optical radiation), at least two of them may have different optical path lengths.

In some embodiments, the optical radiation modulation device 200 further includes an input coupler arranged optically upstream of and optically coupled with the coupler 204. The input coupler may be used to couple, e.g., removably couple, the optical radiation modulation device 200 with an optical radiation generator that is operable to provide the optical radiation (e.g., the single-wavelength optical radiation) to the coupler 204 for providing or distributing to the optical waveguides 202-1 to 202-N.

In some embodiments, the optical radiation modulation device 200 further includes an output coupler arranged optically downstream of and optically coupled with the coupler 206. The output coupler may be used to couple, e.g., removably couple, the optical radiation modulation device 200 with a photoacoustic or optical imaging device to provide the optical radiations outputted by the optical waveguides 202-1 to 202-N to the photoacoustic or optical imaging device.

In some embodiments, the optical radiation modulation device 200 is a laser modulation device, the single-wavelength optical radiation is single-wavelength laser (e.g., pulse), and the multi-wavelength optical radiation is multi-wavelength laser (e.g., pulse).

The following disclosure provides example optical radiation modulation device in some embodiments of the invention, example device for photoacoustic imaging in some embodiments of the invention, and example data processing device and method in some embodiments of the invention. The following examples mainly concern photoacoustic microscopy.

Inventors of the present invention have, through their research, appreciated that photoacoustic microscopy such as optical resolution photoacoustic microscopy (OR-PAM) can be used for label-free functional imaging and can produce high resolution images, and that functional OR-PAM often needs a multi-wavelength laser with a short-switching time and sufficient energy to enable functional imaging, i.e., calculation of the functional parameters, such as oxygen saturation ($sO_2$) and blood-flow speed.

Inventors of the present invention are aware of various approaches or methods for generating multi-wavelength laser and their potential problems. One existing approach to generate multi-wavelength laser is to use multiple laser sources of different wavelengths. Problematically, most commercially-available laser generators can only provide single wavelength laser and the use of multiple ones of these laser generators may be not economical and may be inefficient. Another approach to generate multi-wavelength laser is to process the single-wavelength laser provided by a laser generator to generate multi-wavelength laser. In some examples, some optical crystals or material, such as the optical parametric oscillation (OPO) device, may generate wavelength different from the original wavelength based on wavelength shift effect. Problematically, however, these existing optical parametric oscillation devices can only offer one wavelength at a time and the switching of wavelengths (the provision of different wavelengths) may not be sufficiently fast for functional imaging. Yet another approach to generate fast multi-wavelength laser is to use a fast single-wavelength laser generator and a non-linear effect based device to obtain the multi-wavelength laser pulse. In this respect, the use of high energy stimulated Raman scattering effect based crystal or stimulated Raman scattering effect based optical fiber can generate a fast multi-wavelength pulse with a short switching time.

Inventors of the present invention have found that stimulated Raman scattering effect based optical fiber laser source (i.e., laser modulation device) is a relatively advanced approach to obtain multi-wavelength laser pulse. For example, with a pumped laser pulse, a high-order (first order or higher order) Raman light pulse can be generated via a single-mode optical fiber with tens of meters of length, and the optical path length of the single-mode optical fiber may delay the pulse. For example, optical elements, such as mirrors, lenses, filters, couplers, etc., can be used to process the Raman light pulse to select specific wavelength(s) from the generated Raman light pulse. For example, Zhu et al., "Self-fluence-compensated functional photoacoustic microscopy (2021)", in FIG. 1 and related description, teaches an optical system that can generate three-wavelength laser from a single-wavelength laser provided by a single-wavelength laser generator. The optical system in Zhu uses various optical elements, such as mirrors, lenses, filters, couplers, and optical fibers to process the single-wavelength laser pulse in three different optical paths, two of which make use of optical fibers, to generate three laser pulses with different wavelengths. The three generated laser pulses are coupled into optical fiber to output to an imaging device. The generated laser pulses form a laser pulse train, which can be provided to the subject or object to stimulate photoacoustic signals from the subject or object. The stimulated photoacoustic signals can be collected and processed using image processing algorithms to perform functional imaging. As another example, Liu et al., "Five-wavelength optical-resolution photoacoustic microscopy of blood and lymphatic vessels (2021)", in FIG. 1 and related description, teaches an optical system that can generate five-wavelength laser from a single-wavelength laser provided by a single-wavelength laser generator. Similar to Zhu, the optical system in Liu also uses various optical elements, such as mirrors, lenses, filters, couplers, and optical fibers to process the single-wavelength laser pulse to generate laser pulses with five different wavelengths.

Inventors of the present invention have found that one problem with some existing optical systems (such as the ones in Zhu and Liu) is that the optical paths in the optical systems are constructed using many different optical elements (lenses, mirrors, etc.) in addition to optical fibers, and so the optical system includes a relatively large number of free-space to optical fiber couplings. Also, these existing systems require relatively complex optical configuration, especially numerous free-space to optical fiber couplings, which may cause the stimulated Raman scattering effect based optical fiber laser source (i.e., laser modulation device) to suffer from instability and deployment complexity.

Inventors of the present invention have determined, through their own research, experiments, and trials, that the coupling efficiency of the free-space to optical fiber coupling is sensitive to perturbation. For example, for single-mode optical fiber, a small displacement of the optical beam may result in a decrease in the coupling efficiency due to the small mode field diameter of single-mode optical fiber (e.g., of about 3 μm). The coupling efficiency may also be easily deteriorated by airflow and temperature change in the environment in which the optical fiber or optical fiber coupling is arranged. This may cause problems. As one example, to maintain adequate coupling efficiency, the optical fiber coupler may need to be adjusted every time before use, thus is inefficient in operation. As another example, the optical systems with these various optical elements and numerous free-space to optical fiber couplings may not be readily portable and may not be easily moved and deployed in another location. This means that coupling adjustments may need to be performed by skilled individuals frequently. These problems limit the application of stimulated Raman scattering effect based optical fiber laser source (i.e., laser modulation device). Inventors of the present invention have therefore determined that if the number of free-space to optical fiber couplings in the optical systems can be reduced, then stimulated Raman scattering effect based optical fiber laser source (i.e., laser modulation device) can be more readily applied and can provide more stable performance in some applications.

To address or ameliorate one or more of the above problems, or, more generally, to promote the application of stimulated Raman scattering effect based optical fiber laser, one embodiment of the invention provide an optical fiber based stimulated Raman scattering effect based optical fiber laser source, i.e., a laser modulation device that modulates single-wavelength laser provided by a laser generator to provide laser suitable for use for performing photoacoustic microscopy, in particular optical resolution photoacoustic microscopy. The laser source applied in a photoacoustic microscopy system for performing photoacoustic microscopy is referred to below as "FPAM". Generally speaking, "FPAM" method can be used to decouple hybrid time-domain and frequency-domain optical signals, and is different from traditional photoacoustic microscopy method "TPMA" (such as those in Zhu and Liu), which uses hybrid free-space based optical elements and optical fibers and uses direct time-domain signal extraction.

In one embodiment of the invention, Raman light generation and optical transfer are mainly implemented by optical fibers, not by free-space based optical elements such as lenses, mirrors, etc. Thus, compared with some existing systems, a reduced number of free-space to optical fiber coupling is needed to optically couple laser from the laser generator (e.g., pump laser) to the optical paths of the optical fiber laser source (i.e., laser modulation device). The reduced number of free-space to optical fiber couplings can enhance the stability of the optical paths of the optical fiber laser source and simplify the operation of the optical paths of the optical fiber laser source. Also, with a reduced number of free-space to optical fiber couplings, the optical system or the optical fiber laser source (i.e., laser modulation device) may become more portable and readily deployable (e.g., without the need of frequent adjustment or calibration).

Figure 3:
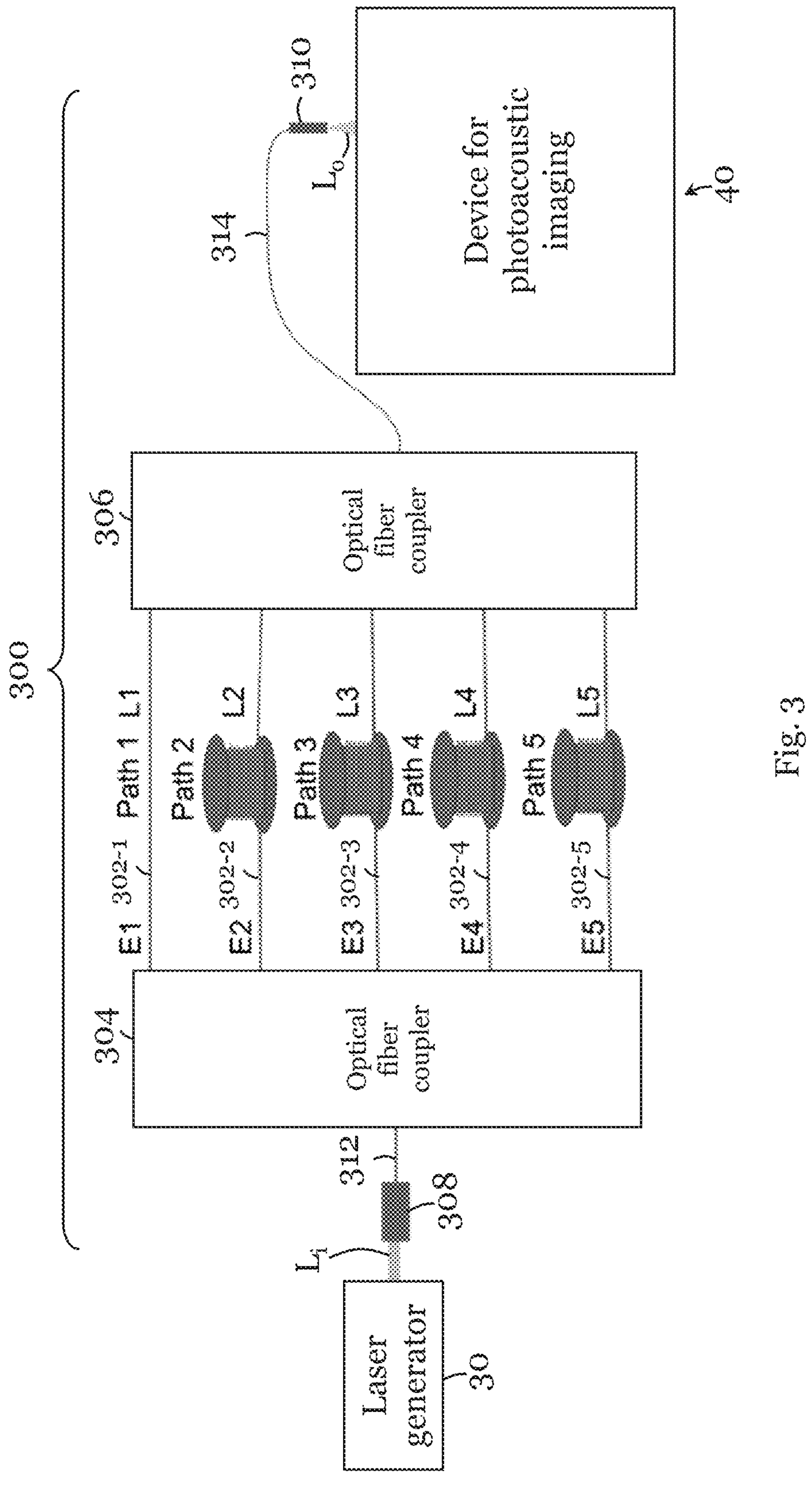
FIG. 3 is a schematic diagram illustrating an optical radiation modulation device in one embodiment of the invention.

FIG. 3 shows an optical radiation modulation device 300 in one embodiment of the invention. The optical radiation modulation device 300 is a laser modulation device, and it may be considered as a specific example implementation of the optical radiation modulation device 200 of FIG. 2.

As shown in FIG. 3, in this embodiment, the optical radiation modulation device 300 is optically coupled between a laser generator 30 and a device for photoacoustic imaging 40.

In this example, the optical radiation modulation device 300 includes five optical fibers 302-1 to 302-5 arranged in five optically parallel paths, path 1 to path 5, between two optical fiber couplers 304, 306. In this embodiment, the first optical fiber 302-1 has an optical length L1, the second optical fiber 302-2 is a single-mode optical fiber and has an optical length L2 longer than L1, the third optical fiber 302-3 is a single-mode optical fiber and has an optical length L3 longer than L2, the fourth optical fiber 302-4 is a single-mode optical fiber and has an optical length L4 longer than L3, and the fifth optical fiber 302-5 is a single-mode optical fiber and has an optical length L5 longer than L4. In this example, the first optical fiber 302-1 is arranged to enable passage of laser substantially without wavelength modulation whereas the other optical fibers 302-2 to 302-5 are each arranged to modulate the laser it respectively receives based on stimulated Raman scattering. The optical fiber coupler 304 connects with input ends of all of the optical fibers 302-1 to 302-5. The optical fiber coupler 304 is a 1-to-n coupler (in this example, n=5) arranged to receive laser from the laser generator 30 and to provide or distribute (e.g., divide) the received laser to the five optical fibers 302-1 to 302-5. The optical fiber coupler 306 connects with output ends of all of the optical fibers 302-1 to 302-5. The optical fiber coupler 306 is arranged to receive or collect optical radiations outputted by the optical fibers 302-1 to 302-5, and to provide them to the device for photoacoustic imaging 40.

In this example, the optical radiation modulation device 300 also includes an input coupler 308 arranged to optically couple and align with the laser generator 30 to receive the laser $L_i$ provided by the laser generator 30. The input coupler 308 is connected with the optical fiber coupler 304 via an optical fiber 312, to provide the laser $L_i$ to the optical fiber coupler 304 for further distribution or provision to the optical fibers 302-1 to 302-5. In this example, the optical fiber coupler 304 is arranged to split the laser $L_i$ into the optical fibers 302-1 to 302-5 according to specific or predefined energy ratio. The relative energy of the laser $L_i$ distributed or provided to the optical fibers 302-1 to 302-5 is represented as E1 to E5 respectively (for path 1 to path 5). The optical fiber coupler 306 receives or combines the outputs from these optical fibers 302-1 to 302-5, then passes these outputs to the output coupler 310 via an optical fiber 314. The output coupler 310 may be used to optically couple with the device for photoacoustic imaging 40 to provide the optical radiations outputted by the optical fibers 302-1 to 302-5 to the device for photoacoustic imaging 40 as a (modulated) laser $L_o$.

In this example, the laser generator 30 is a single-wavelength pulsed laser that generates laser pulses of 532 nm. The 532 nm laser pulse is received by the input coupler 308 and by the optical fiber coupler 304 via the optical fiber 312. The optical fiber coupler 304 distributes or provides the 532 nm laser pulse into the five optical fibers 302-1 to 302-5 in accordance with the predetermined relative energy E1 to E5, such that each of the five optical fibers 302-1 to 302-5 receives a respective portion of the 532 nm laser pulse or a respective 532 nm laser pulse.

In this example, in path 1 provided by the optical fiber 302-1, the 532 nm laser pulse is allowed to pass through to reach the optical fiber coupler 306 substantially without wavelength modulation or modification.

In this example, in path 2 provided by the (single-mode) optical fiber 302-2, the 532 nm laser pulse received in path 2 is modulated by the (single-mode) optical fiber 302-2 with length L2 based on stimulated Raman scattering effect, to generate laser pulse with 532 nm (the original wavelength) as well as a first order Stokes wavelength 545 nm. The 532/545 nm laser pulse is provided to the optical fiber coupler 306. As the optical path length of path 2 is longer than that of path 1, the 532/545 nm laser pulse provided by path 2 has a time delay compared with the 532 nm laser pulse provided by path 1.

In this example, in path 3 provided by the (single-mode) optical fiber 302-3, the 532 nm laser pulse received in path 3 is modulated by the (single-mode) optical fiber 302-3 with length L3 based on stimulated Raman scattering effect, to generate laser pulse with 532 nm (the original wavelength) as well as first and second order Stokes wavelengths 545 nm and 558 nm. The 532/545/558 nm laser pulse is provided to the optical fiber coupler 306. As the optical path length of path 3 is longer than that of path 2, the 532/545/558 nm laser pulse provided by path 3 has a time delay compared with the 532/545 nm laser pulse provided by path 2.

In this example, in path 4 provided by the (single-mode) optical fiber 302-4, the 532 nm laser pulse received in path 4 is modulated by the (single-mode) optical fiber 302-4 with length L4 based on stimulated Raman scattering effect, to generate laser pulse with 532 nm (the original wavelength) as well as first, second, and third order Stokes wavelengths 545 nm, 558 nm, and 571 nm. The 532/545/558/571 nm laser pulse is provided to the optical fiber coupler 306. As the optical path length of path 4 is longer than that of path 3, the 532/545/558/571 nm laser pulse provided by path 4 has a time delay compared with the 532/545/558 nm laser pulse provided by path 3.

In this example, in path 5 provided by the (single-mode) optical fiber 302-5, the 532 nm laser pulse received in path 4 is modulated by the (single-mode) optical fiber 302-5 with length L5 based on stimulated Raman scattering effect, to generate laser pulse with 532 nm (the original wavelength) as well as first and higher order Stokes wavelengths 545 nm, 558 nm, 571 nm, and 620/640 nm. The 532/545/558/571/620/640 nm laser pulse is provided to the optical fiber coupler 306. As the optical path length of path 5 is longer than that of path 4, the 532/545/558/571/620/640 nm laser pulse provided by path 5 has a time delay compared with the 532/545/558/571 nm laser pulse provided by path 4.

The resulting laser $L_o$ provided to the device for photoacoustic imaging 40 is therefore a pulse train with five temporally spaced laser pulses provided by the optical fibers 302-1 to 302-5. The pulse train with the five laser pulses can be provided to an object or subject to stimulate corresponding temporally spaced photoacoustic signals from the subject or object. The stimulated photoacoustic signals can be collected and processed to perform functional imaging.

In this example, the pulse train (with the five laser pulses) can be expressed as an energy matrix A:

$$A = \begin{bmatrix} e1 & 0 & 0 & 0 & 0 \\ e2 & e3 & 0 & 0 & 0 \\ e4 & e5 & e6 & 0 & 0 \\ e7 & r8 & e9 & e10 & 0 \\ e11 & e12 & e13 & e14 & e15 \end{bmatrix} \quad (1)$$

where each row corresponds to energy of wavelength in a particular laser pulse (e.g., row 1=pulse in path 1, row 2=pulse in path 2, etc.), and each column corresponds to energy of a particular wavelength (e.g., column 1=532 nm, column 2=wavelength 545 nm).

The pulse train of the laser $L_o$ generated by the optical radiation modulation device 300 can stimulate a corresponding photoacoustic signal train (from the object or subject being imaged), and the mathematic model is expressed as:

$$A * X = Y \quad (2)$$

where A is the energy matrix, X is the unit photoacoustic signal of a functional parameter (e.g., total hemoglobin), and Y is the coupled signal, i.e., the detected photoacoustic signal. By solving equation (2), the single wavelength photoacoustic signal of each pulse can be extracted. Then, based on these decoupled photoacoustic signals, functional parameters associated with the object or subject can be calculated.

Although the above example of the optical radiation modulation device 300 of FIG. 3 is presented with reference to five optical fibers, the skilled person would appreciate that in other embodiments the optical radiation modulation device 300 can have more than five or less than five (but at least two) optical fibers. The skilled person would also appreciate that, in other examples, depending on the number of wavelengths and/or pulses generated, the energy matrix A can have a different number of elements (rows and/or columns).

In one example implementation of the optical radiation modulation device 300, the optical fibers 302-1 to 302-5 are formed using Nufern S460-HP fibers. In one example implementation of the optical radiation modulation device 300, the optical fiber couplers 304, 306 are formed using Nufern 460-HP fibers. In some embodiments, the wavelengths of laser pulse provided by one or more of the optical fibers may include 532/545/558/571/584/597/620/633/ . . . /710 nm.

Figure 4:
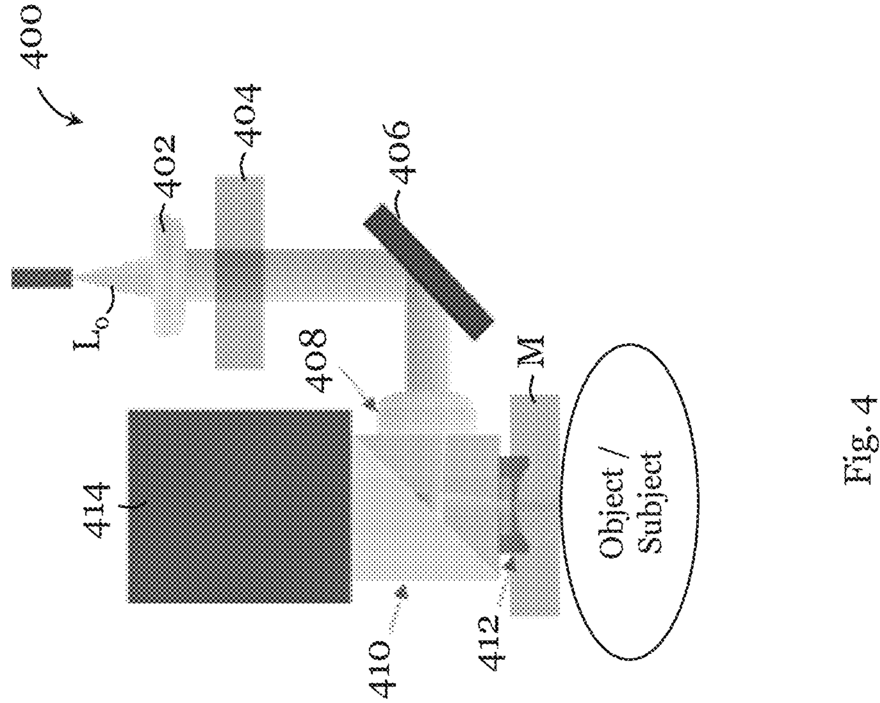
FIG. 4 is a schematic diagram illustrating a device for photoacoustic imaging in one embodiment of the invention.

FIG. 4 shows a device for photoacoustic imaging 400 in one embodiment of the invention. The device for photoacoustic imaging 400 may be used as the device for photoacoustic imaging 40 illustrated in FIG. 3. The device for photoacoustic imaging 400 is arranged to receive laser $L_o$ from an optical radiation modulation device (e.g., the optical radiation modulation device 300), process it, and provide it to the subject or object to perform photoacoustic imaging. In this embodiment, the device for photoacoustic imaging 400 is in the form of a probe, which may be manipulated (e.g., moved) relative to the subject or object to perform photoacoustic imaging.

Referring to FIG. 4, the device for photoacoustic imaging 400 includes an achromatic lens 402 arranged to collimate the laser beam $L_o$ received from an optical radiation modulation device (e.g., the optical radiation modulation device 300), and a filter arrangement 404 with one or more optical filters for blocking or attenuating one or more frequencies in the laser $L_o$. The filter arrangement 404 can thus further modulate the laser beam $L_o$ before providing it to the object or subject for imaging. The device for photoacoustic imaging 400 also includes an optical reflector (e.g., mirror) 406 arranged to reflect the filtered laser light to an objective lens 408 for focusing, and an optical combiner (prisms) 410 that can reflect the focused laser light towards the object or subject to be imaged to stimulate generation of photoacoustic signals by the object or subject. In this example, the focused laser light is provided to the object or subject via a coupling medium M, such as water in a water tank. The device for photoacoustic imaging 400 also includes an acoustic lens 412 that is arranged to collimate the photoacoustic signals provided by the object or subject (via the coupling medium M). The collimated photoacoustic signals transmit through the optical combiner (prisms) 410 and reaches an ultrasound transducer 414. In some embodiments, a movement mechanism (not shown), such as one or more linear stages, may be provided to translate the device for photoacoustic imaging 400 in 1D or 2D directions (e.g., x- and y-directions) for scanning. In one embodiment, the photoacoustic signals that reach the ultrasound transducer 414 are then amplified by amplifier(s) and digitized by an acquisition device (e.g., acquisition card). The signals are then processed for performing photoacoustic imaging such as functional photoacoustic imaging.

In one example implementation of the device for photoacoustic imaging 400, the objective lens 408 is lens #33-202 from Edmund Optics. In one example implementation of the device for photoacoustic imaging 400, the prisms of the combiner 410 are prisms #32-331 and #32-330 from Edmund Optics. In one example implementation of the device for photoacoustic imaging 400, the acoustic lens 412 is lens #45-697 from Edmunds Optics. In one example implementation of the device for photoacoustic imaging 400, the ultrasound transducer 404 is ultrasound transducer V214-BC-RM from Olympus. In one example implementation of the device for photoacoustic imaging 400, the linear stage of the movement mechanism is linear stage PLS-85 from Physik Instrument. In one example implementation of the device for photoacoustic imaging 400, the amplifiers are amplifiers ZFL-500LN+ from Mini-Circuits. In one example implementation of the device for photoacoustic imaging 400, the acquisition device is an acquisition card ATS9360 from Alazar Technologies.

In the above examples, the optical radiation modulation device 300 and the device for photoacoustic imaging 400 are primarily used in photoacoustic imaging systems. In other examples, the optical radiation modulation device 300 and/or the device for photoacoustic imaging 400 may be used in other optical or photoacoustic imaging systems, such as systems for laser scanning fluorescence microscopy and optical coherence tomography, which require multi-wavelength light such as multi-wavelength laser.

An example dual-wavelength configuration for functional photoacoustic imaging is now described to illustrate the operation principle.

In this example, 532 and 558 nm pulsed laser is provided to a subject (sample) to stimulate photoacoustic signal pulses, for determining oxygen saturation ($sO_2$) of the subject. In this example, a modified optical radiation modulation device with only paths 1 and 3 between the optical fiber couplers 304 and 306 of the optical radiation modulation device 300 is used.

Figure 5:
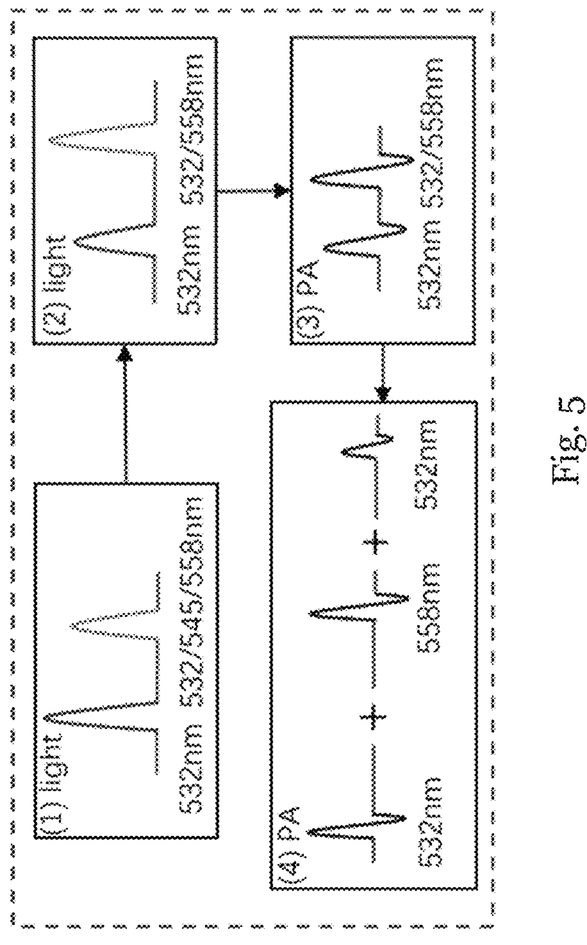
FIG. 5 is a schematic diagram illustrating change and translation of optical and photoacoustic signals in one embodiment of the invention.

FIG. 5, in (1), shows the pulse train of the 532 nm pulse and the 532/545/558 nm pulse outputted by the modified optical radiation modulation device. The pulse train is then provided to the device for photoacoustic imaging 400. In this example, the filter arrangement 404 in the device for photoacoustic imaging 400 blocks all 545 nm light but attenuates half of the 532 nm light. As a result, the pulse train becomes the one shown in FIG. 5, in (2), with the 532 nm pulse and a 532/558 nm pulse. Due to the attenuation of the 532 nm light, the 558 nm light in the pulse of 532/558 nm light can be enhanced. The 532 nm and 532/558 nm pulses are then provided to the subject to stimulate generation of photoacoustic signals. FIG. 5, in (3), shows the stimulated photoacoustic signals generated by the subject and obtained by the device for photoacoustic imaging 400. By decoupling the photoacoustic signals, the photoacoustic signals associated with the 532 nm pulse and the photoacoustic signals associated with the 532/558 nm pulse can be obtained, as shown in FIG. 5, in (4).

The stability of the developed laser output from the device for photoacoustic imaging 400 (optically coupled with the modified optical radiation modulation device) in this example is investigated.

Figure 6:
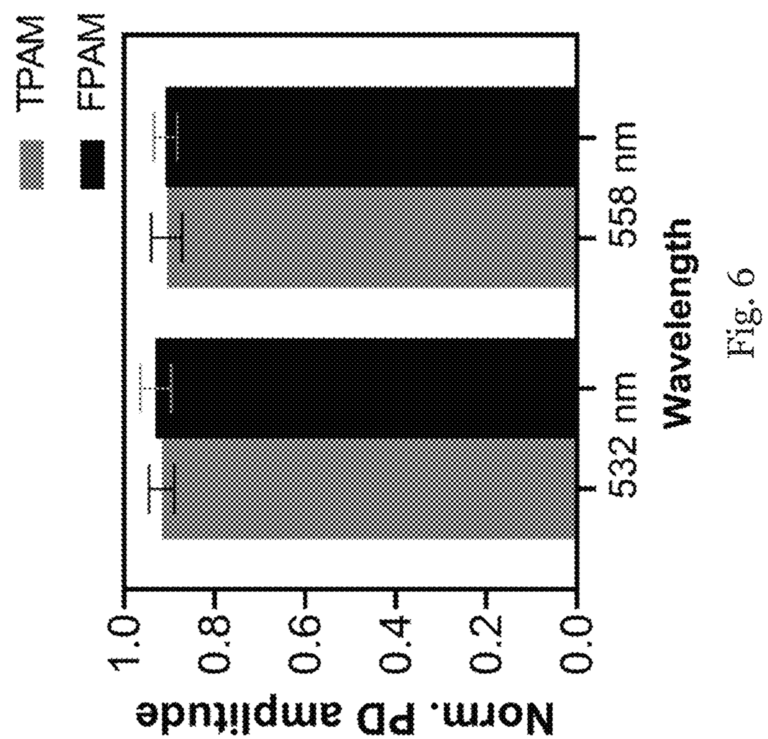
FIG. 6 is a graph showing optical stability of the optical fiber based photoacoustic microscopy method ("FPAM") in one embodiment of the invention and a traditional photoacoustic microscopy method ("TPAM")

FIG. 6 shows the optical stability by the statistics of the A-line amplitude obtained from a photodiode. The 532/558 nm laser of the traditional photoacoustic microscopy method "TPAM" (such as those in Liu and Zhu) is compared with that of the method "FPAM" in this example. The 532 nm and 558 nm light are collected by the photodiode with a 500 MHz sampling frequency. A bandpass filter is used to choose the 558 nm for the investigation. FIG. 6 shows that the laser pulse generated by the method "FPAM" in this example and the laser pulse generated by the traditional photoacoustic microscopy method "TPAM" have similar standard deviation. This suggests that the method "FPAM" in this example can provide suitable and stable laser light for performing dual-wavelength imaging in this example.

As mentioned above, the free-space to optical fiber coupling or the associated coupler poses instability that may affect the optical output. Let the stability probability of such a coupler be "p" for a coupler. Existing n wavelengths laser source typically requires 2n−1 such couplers (n is any integer), thus the stability probability is $p^{(2n-1)}$. In some embodiments of the invention, however, the optical fiber laser source can include reduced number of such couplers hence is more stable. For example the optical fiber laser source of the invention can be an m wavelengths laser source that uses less than 2m−1 couplers (m is any integer equal to or larger than 2). In some embodiments, the optical fiber laser source can include only one such coupler, hence may have a stability probability p. Thus the stability of the optical fiber laser source in these embodiments is much more stable than the traditional or existing multi-wavelength laser source. Indeed, the stability of the optical fiber laser source in these embodiments becomes more advantageous as the number of wavelengths increases.

For a traditional Raman laser source, the creation of an optical path typically requires a beam splitter, two couplers, a light-combining element, and no less than three mirrors. Each of these optical elements require a respective optical adjustment mount. As a result, the operation and construction cost may be higher than using optical fiber and optical fiber couplers. This is particularly the case as the number of optical paths increase, because both the complexity of the optical paths and the associated operation and construction cost may increase dramatically. This may in turn pose technical and operation challenges to users. For example, the users have to spend significant time and effort to adjust the free-space to optical fiber coupling to maintain the proper coupling ratio. Compared with these traditional Raman laser source, the optical fiber laser source in embodiments of the invention can improve the ease of operation and/or may reduce operation and construction cost and/or improve operation efficiency.

Simulation is performed to demonstrate decoupling of photoacoustic signals in one example of the invention. In this example, an A-line signal is collected from the device for photoacoustic imaging 400 by performing imaging/scanning of a mouse ear. To design the coupled signals (i.e., the detected photoacoustic signals), and to decouple the photoacoustic signals, we construct the energy matrix A:

$$A = \begin{bmatrix} e1 & 0 \\ e2 & e3 \end{bmatrix}$$

where e1 and e2 are the 532 nm wavelength energy at the first pulse and the 532 nm wavelength energy at the second pulse respectively, and e3 is the 558 nm wavelength energy at the second pulse.

Figure 7:
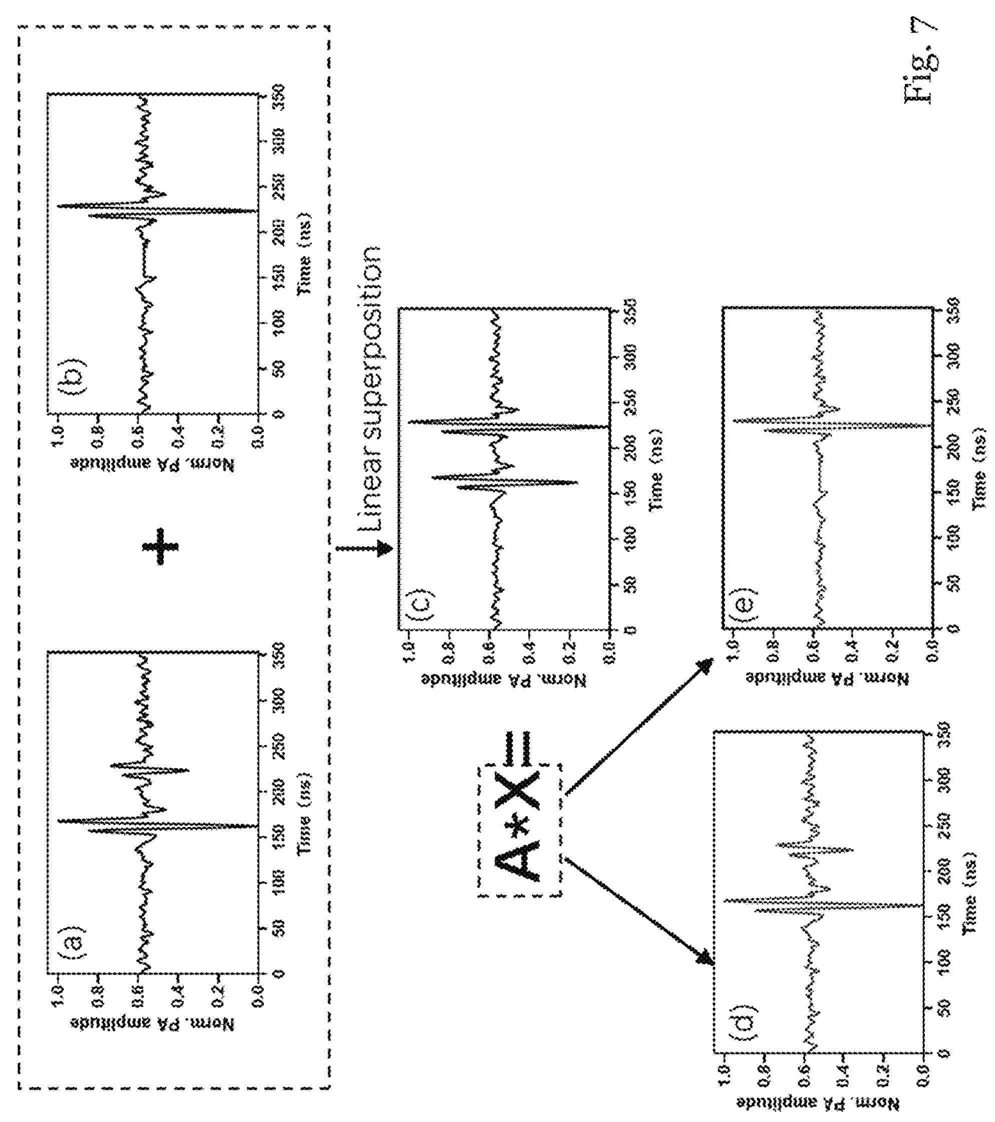
FIG. 7 is a schematic diagram illustrating a photoacoustic signal decoupling operation in one embodiment of the invention.
Figure 8:
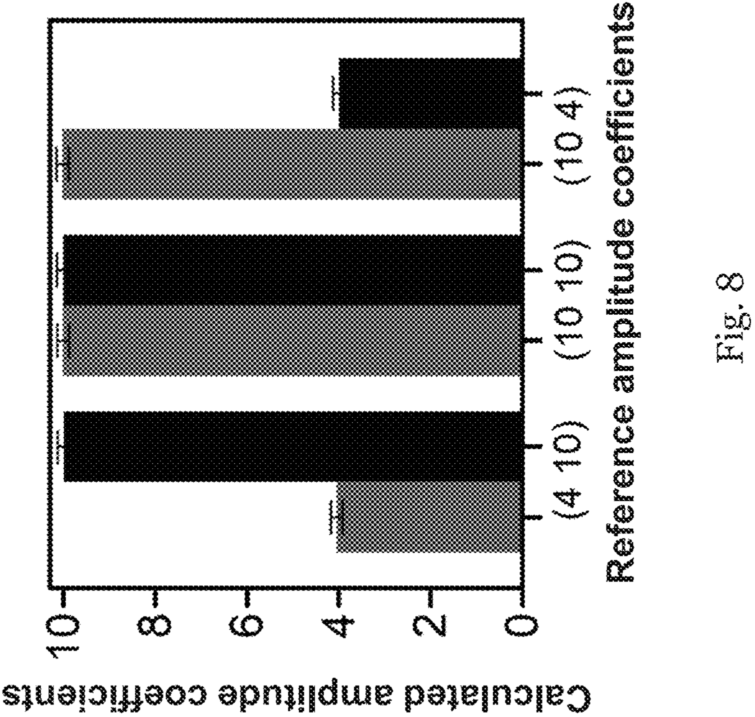
FIG. 8 is a graph showing calculated results (calculated amplitude coefficients) of the photoacoustic signal decoupling method of FIG. 6 compared with reference results (reference amplitude coefficients)

FIG. 7, in (a) and (b), shows two photoacoustic signals formed by normalizing a detected photoacoustic signal and multiplying it with designed amplitude coefficients at the designed position of the A-line and then multiplying with matrix A. The two photoacoustic signals are linearly added or superposed to form the signal in FIG. 7, (c). The decoupled signal shown in FIG. 7, in (d) and (e), can be obtained by solving equation (2). In this example, the computational stability is affected by the condition of the matrix A. Different amplitude coefficients (a1, a2) is used to test the computational stability. In this example, the elements "a1" and "a2" are the amplitude coefficients at 532 nm and 558 nm respectively. Specifically, in this example, the amplitude coefficients of (4, 10), (10, 10), and (10, 4) are used to test the calculation stability. After the decoupling process, the calculated result is shown in FIG. 8. With 600 times of calculation, the calculation result shows that while some errors exist the solution is sufficiently stable. The simulation result shows that the decoupling method can decouple the photoacoustic signals.

In this example, the first photoacoustic signal is stimulated by 532 nm light and the second photoacoustic signal is stimulated by 532/558 nm light. Therefore, the second photoacoustic signal includes dual-wavelength information.

As an example, for the dual-wavelength optical fiber laser source, the energy can be expressed as a matrix:

$$A = \begin{bmatrix} 60 & 0 \\ 26 & 65 \end{bmatrix}$$

where the first column is the 532 nm light energy (nJ) of the first laser pulse and the 532 nm light energy (nJ) of the second laser pulse respectively, whereas the second column is the 558 nm light energy of the first laser pulse and second laser pulse respectively. Suppose the photoacoustic signal amplitudes of the two photoacoustic signals are:

$$Y = \begin{bmatrix} y_1 \\ y_2 \end{bmatrix}$$

where $y_1$ and $y_2$ are the amplitudes of the first and second photoacoustic signals. Based on A, and Y, and using equation (2), X can be solved. By solving for X for each pixel, we can construct a map associated with the 532 nm light and the 558 nm light. These two maps can be used to calculate the $sO_2$.

To verify that the method "FPAM" in this example can accurately measure $sO_2$ by using the decoupled photoacoustic signals, the result obtained using the method "FPAM" in this example is compared against the result obtained using the traditional photoacoustic microscopy method "TPAM". In this example, for TPAM, the energy of the 532 nm and 558 nm light is 60 nJ and 65 nJ respectively, and they can be expressed as $$A = \begin{bmatrix} 60 & 0 \\ 0 & 65 \end{bmatrix}.$$

Figures 9A, 9B, 9C, 10A, 10B, 10C:
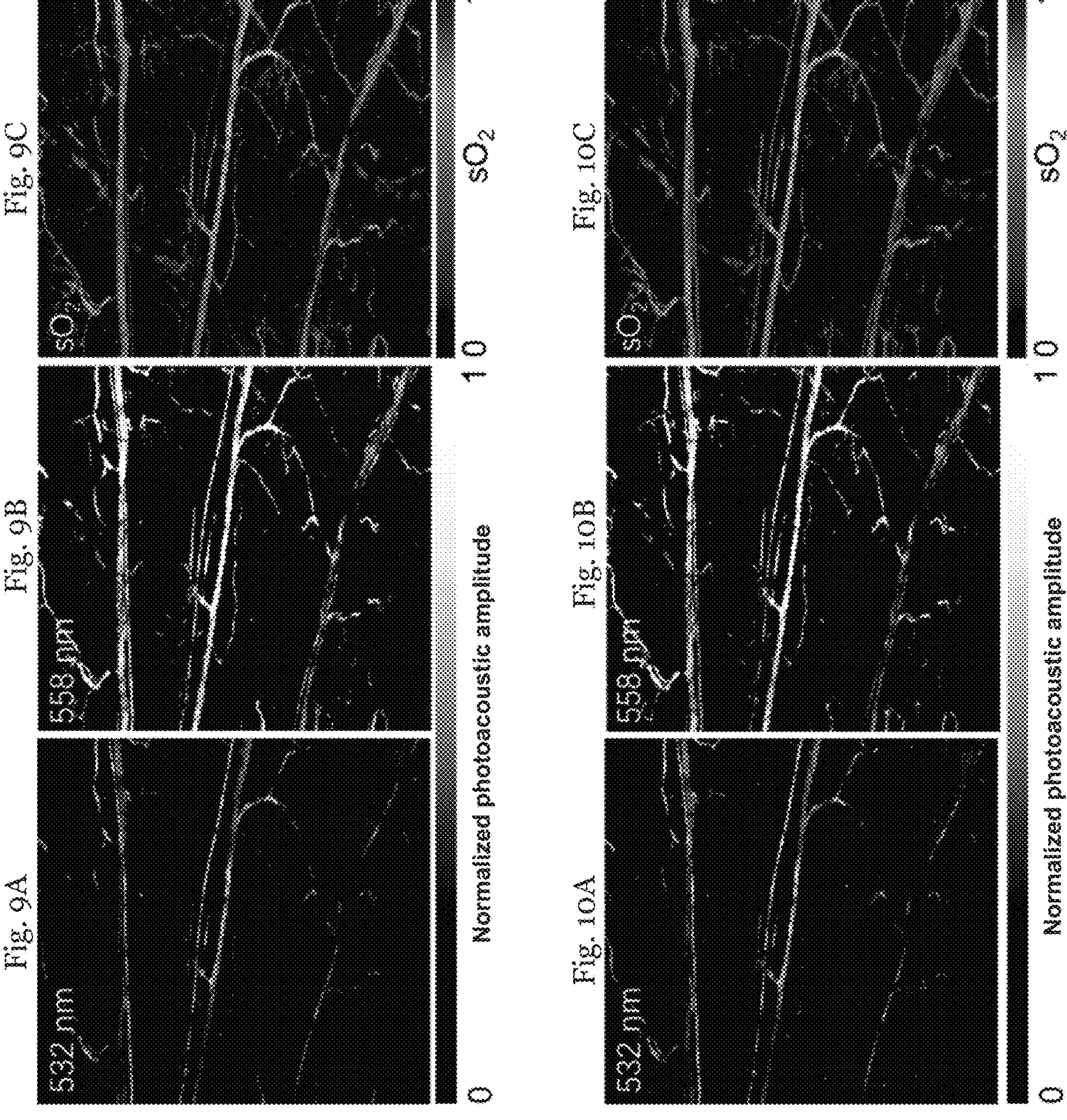
FIG. 9A is an image showing normalized photoacoustic amplitudes of microstructure of a mouse ear obtained using the traditional photoacoustic microscopy method (stimulated by 532 nm laser)
FIG. 9B is an image showing normalized photoacoustic amplitudes of microstructure of a mouse ear obtained using the traditional photoacoustic microscopy method (stimulated by 558 nm laser)
FIG. 9C is an image showing normalized oxygen saturation ($sO_2$) of microstructure of a mouse ear obtained using the traditional photoacoustic microscopy method.
FIG. 10A is an image showing normalized photoacoustic amplitudes of microstructure of a mouse ear obtained using an optical fiber based photoacoustic microscopy method in one embodiment of the invention (stimulated by 532 nm laser)
FIG. 10B is an image showing normalized photoacoustic amplitudes of microstructure of a mouse ear obtained using the optical fiber based photoacoustic microscopy method in one embodiment of the invention (stimulated by 558 nm laser)
FIG. 10C is an image showing normalized oxygen saturation ($sO_2$) of microstructure of a mouse ear obtained using the optical fiber based photoacoustic microscopy method in one embodiment of the invention.

FIGS. 9A to 9C show the microstructure images of the mouse ear (at 532 nm and 558 nm respectively) imaged by the method "TPAM", and the corresponding $sO_2$ image of the mouse ear. FIGS. 10A to 10C show the microstructure (at 532 nm and 558 nm respectively) images of the mouse ear that are reconstructed using the decoupling process of the photoacoustic data from the method "FPAM" in this example, and the corresponding $sO_2$ image of the mouse ear. Comparing FIGS. 9A and 9B with FIGS. 10A and 10B, it can be seen that the two methods provide near identical results.

Figure 11:
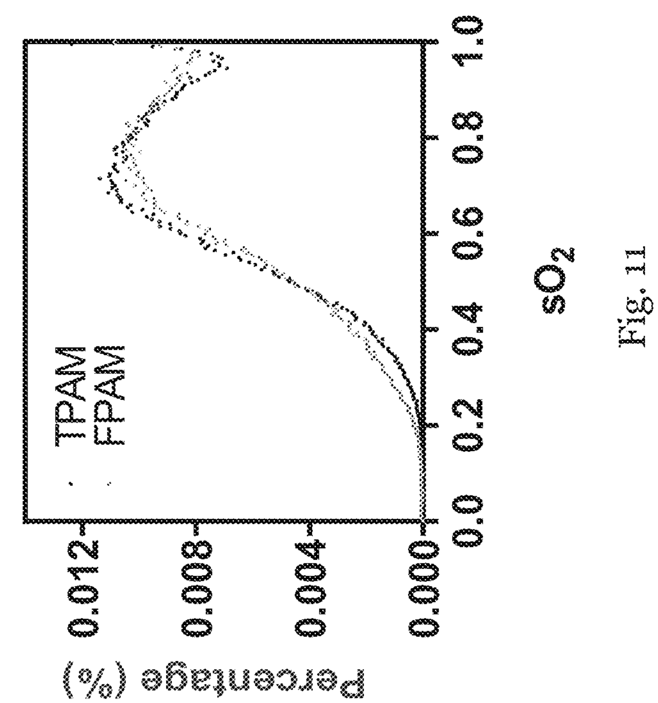
FIG. 11 is a graph showing $sO_2$ pixels distribution (percentage) of the traditional photoacoustic microscopy method and the optical fiber based photoacoustic microscopy method in one embodiment of the invention.

FIG. 11 shows that the "TPAM" method and the "FPAM" method have similar $sO_2$ pixels distribution.

Figure 12:
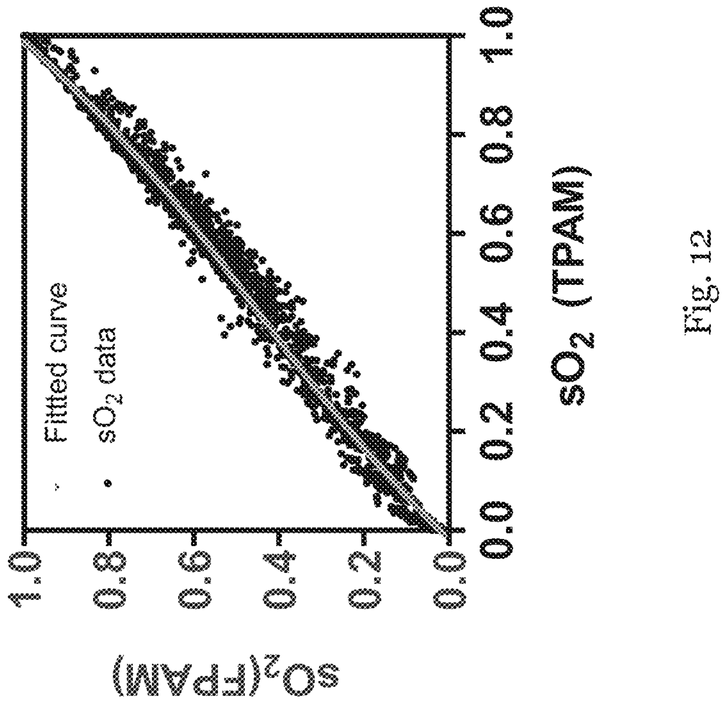
FIG. 12 is a graph showing pixel-to-pixel $sO_2$ between the traditional photoacoustic microscopy method and the optical fiber based photoacoustic microscopy method in one embodiment of the invention.

FIG. 12 shows the pixel-to-pixel $sO_2$ obtained using the two methods, by quantifying the similarity of the $sO_2$ pixels of FIGS. 9C and 10C. As shown in FIG. 12, the polynomial fitted curve of the pixel-to-pixel $sO_2$ is a generally straight line with slope of about 1 (about 45° with reference to x- or y-axis). The $sO_2$ data are distributed next to the fitted curve with a standard deviation of 0.033. This indicates that the pixel obtained using the "FPAM" matches well with that of the "TPAM" method. Thus, it can be determined that the $sO_2$ obtained using the "FPAM" method is correct or accurate, as it is almost the same as that obtained using the "TPAM" method. The difference in the results between the two methods are mainly due to the fact that the scanning are performed separately at different times hence the $sO_2$ may have slightly changed during this time period. The experiment result verifies that the "FPAM" method can be used to obtain photoacoustic signals.

Some of the above examples of the invention have provided an optical fiber based laser source and related photoacoustic imaging system. In some examples, the optical fiber based laser source has a limited number of free-space to optical fiber coupling or associated couplers. This may improve operation efficiency and reduce cost and effort to set up the optical fiber based laser source and related photoacoustic imaging system. In some examples, the optical fiber based laser source makes use of two or more optical fibers, at least one of which is a Raman fiber with a certain length that can generate Raman light with a corresponding time delay. The optical fiber based laser source can provide outputs of all the optical fibers, to provide a pulse train with light pulses separated in the time domain and light pulse with a mixed spectrum in the frequency domain. In some examples, there is provided an algorithm to decouple the photoacoustic signals obtained from the object or subject as a result of providing a pulse train (with light pulses separated in the time domain and light pulse with a mixed spectrum in the frequency domain) to the object or subject. The decoupled signals can be used for performing functional imaging, e.g., determining $sO_2$ of the object or subject. In some examples, the optical fiber couplers in the optical fiber based laser source are responsible for splitting, merging, and transmitting various light beams. This may effectively decrease the cost of the optical path effectively. In some examples, the optical fiber based laser source can be made relatively small (compared with existing laser sources) and hence relatively portable or readily deployable.

Figure 13:
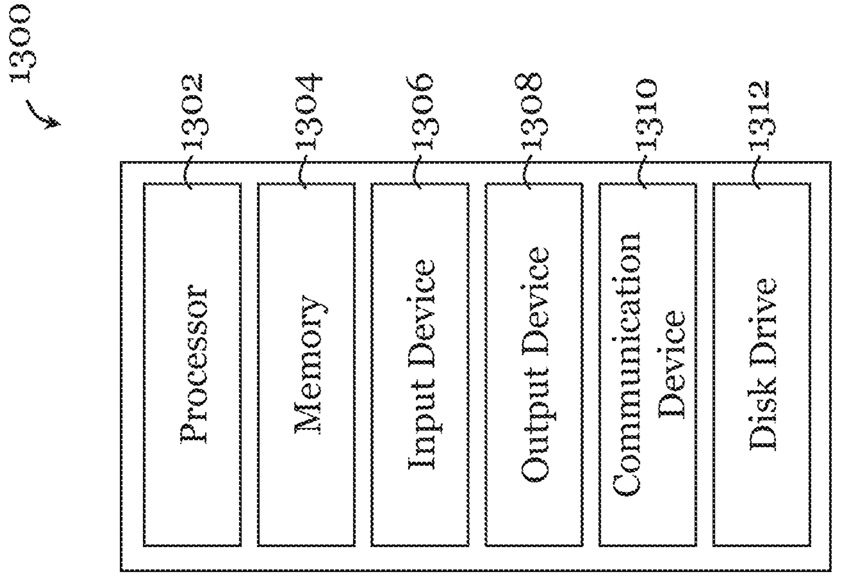
FIG. 13 is a diagram illustrating an example data processing system that can be used to perform one or more of the data processing methods in some embodiments of the invention.

FIG. 13 shows an example data processing system 1300 that can be used to perform the image or image data processing method or algorithm in embodiments of the invention. The data processing system 1300 generally comprises suitable components necessary to receive, store, and execute appropriate computer instructions, commands, and/or codes. The main components of the data processing system 1300 are a processor 1302 and a memory (storage) 1304. The processor 1302 may include one or more: CPU(s), MCU(s), GPU(s), logic circuit(s), Raspberry Pi chip(s), digital signal processor(s) (DSP), application-specific integrated circuit(s) (ASIC), field-programmable gate array(s) (FPGA), or any other digital or analog circuitry/circuitries configured to interpret and/or to execute program instructions and/or to process signals and/or information and/or data. The memory 1304 may include one or more volatile memory (such as RAM, DRAM, SRAM, etc.), one or more non-volatile memory (such as ROM, PROM, EPROM, EEPROM, FRAM, MRAM, FLASH, SSD, NAND, NVDIMM, etc.), or any of their combinations. Appropriate computer instructions, commands, codes, information and/or data may be stored in the memory 1304. For example, images or image data to be processed, or images or image data that have been processed, can be stored in the memory 1304. Computer instructions for executing or facilitating executing the method embodiments of the invention may be stored in the memory 1304. For example, computer instructions of the image or image data processing method or algorithm in embodiments of the invention can be stored in the memory 1304. For example, computer instructions for controlling operation of the device for photoacoustic imaging 400 can be stored in the memory 1304. The processor 1302 and memory 1304 may be integrated or separated (and operably connected). Optionally, the data processing system 1300 further includes one or more input devices 1306.

Example of such input device 1306 include: keyboard, mouse, stylus, image scanner, microphone, tactile/touch input device (e.g., touch sensitive screen), image/video input device (e.g., camera), etc. Optionally, the data processing system 1300 further includes one or more output devices 1308. Example of such output device 1308 include: display (e.g., monitor, screen, projector, etc.), speaker, headphone, earphone, printer, additive manufacturing machine (e.g., 3D printer), etc. The display may include a LCD display, a LED/OLED display, or other suitable display, which may or may not be touch sensitive. The data processing system 1300 may further include one or more disk drives 1312 which may include one or more of: solid state drive, hard disk drive, optical drive, flash drive, magnetic tape drive, etc. A suitable operating system may be installed in the data processing system 1300, e.g., on the disk drive 1312 or in the memory 1304. The memory 1304 and the disk drive 1312 may be operated by the processor 1302. Optionally, the data processing system 1300 also includes a communication device 1310 for establishing one or more communication links (not shown) with one or more other computing devices, such as servers, personal computers, terminals, tablets, phones, watches, IoT devices, or other wireless computing devices. The communication device 1310 may include one or more of: a modem, a Network Interface Card (NIC), an integrated network interface, a NFC transceiver, a ZigBee transceiver, a Wi-Fi transceiver, a Bluetooth® transceiver, a radio frequency transceiver, a cellular (2G, 3G, 4G, 5G, above 5G, or the like) transceiver, an optical port, an infrared port, a USB connection, or other wired or wireless communication interfaces. Transceiver may be implemented by one or more devices (integrated transmitter(s) and receiver(s), separate transmitter(s) and receiver(s), etc.). The communication link(s) may be wired or wireless for communicating commands, instructions, information and/or data. In one example, the processor 1302, the memory 1304 (optionally the input device(s) 1306, the output device(s) 1308, the communication device(s) 1310 and the disk drive(s) 1312, if present) are connected with each other, directly or indirectly, through a bus, a Peripheral Component Interconnect (PCI), such as PCI Express, a Universal Serial Bus (USB), an optical bus, or other like bus structure. In one embodiment, at least some of these components may be connected wirelessly, e.g., through a network, such as the Internet or a cloud computing network. A person skilled in the art would appreciate that the data processing system 1300 shown in FIG. 13 is merely an example and that the data processing system 1300 can in other embodiments have different configurations (e.g., include additional components, has fewer components, etc.).

Although not required, the embodiments described with reference to the Figures can be implemented as an application programming interface (API) or as a series of libraries for use by a developer or can be included within another software application, such as a terminal or computer operating system or a portable computing device operating system. Generally, as program modules include routines, programs, objects, components and data files assisting in the performance of particular functions, the skilled person will understand that the functionality of the software application may be distributed across a number of routines, objects and/or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers, dedicated or non-dedicated hardware devices. Where the terms "computing system" and "computing device" are used, these terms are intended to include (but not limited to) any appropriate arrangement of computer or information processing hardware capable of implementing the function described.

It will be appreciated by a person skilled in the art that variations and/or modifications may be made to the described and/or illustrated embodiments of the invention to provide other embodiments of the invention. The described/or illustrated embodiments of the invention should therefore be considered in all respects as illustrative, not restrictive. Example optional features of some embodiments of the invention are provided in the summary and the description. Some embodiments of the invention may include one or more of these optional features (some of which are not specifically illustrated in the drawings). Some embodiments of the invention may lack one or more of these optional features (some of which are not specifically illustrated in the drawings). For example, the optical radiation modulation device may be used for various optical or photoacoustic imaging systems, not limited to photoacoustic microscopy systems. The optical signals provided by the optical radiation modulation device can be used to perform different imaging and functional imaging tasks, not limited to $sO_2$ imaging. For example, the optical radiation modulation device may be used to process optical radiation of different frequency or frequencies, not limited to laser light, and not limited to 532 nm. The optical fibers of the optical radiation modulation device may modulate wavelength based on other non-linear effect or stimulated scattering effect such as stimulated Brillouin scattering, not limited to stimulated Raman scattering. For example, the optical fibers of the optical radiation modulation device may be different types of optical fibers, such as single-mode or multi-mode optical fibers. The optical radiation modulation device may include any number of two or more optical fibers, depending on applications. The optical fibers of the optical radiation modulation device may be arranged in optical fiber cables (each with one or more optical fibers).

The invention claimed is:

1. An optical radiation modulation device, comprising:

a plurality of optical fibers arranged optically in parallel;

a first coupler coupled with the plurality of optical fibers, the first coupler being operable to receive a single-wavelength optical radiation and to provide or distribute the single-wavelength optical radiation to the plurality of optical fibers to produce optical radiations according to a predefined energy ratio, the optical radiations comprising at least one multi-wavelength optical radiation;

a second coupler optically coupled with the plurality of optical fibers, the second coupler being operable to receive the optical radiations outputted by the plurality of optical fibers; and an output coupler optically coupled with the second coupler, the output coupler being configured to optically couple with an imaging device to provide the optical radiations outputted by the plurality of optical fibers to the imaging device, wherein the plurality of optical fibers comprise:

a first optical fiber operable to modulate the single-wavelength optical radiation provided or distributed to the first optical fiber to generate a multi-wavelength optical radiation for output to the second coupler; and a second optical fiber, wherein the optical radiations from the output coupler are provided to an object or a subject being imaged to stimulate corresponding photoacoustic signals from the subject or the object, and the photoacoustic signals are extracted by an algorithm using the predefined energy ratio for analyzing functional parameters associated with the object or the subject, and wherein the optical radiation modulation device is configured to output multi-wavelength optical radiations by the plurality of optical fibers without optical elements for filtering.

2. The optical radiation modulation device of claim 1, wherein the first optical fiber is operable to generate the multi-wavelength optical radiation based on stimulated Raman scattering such that wavelengths of the multi-wavelength optical radiation comprise wavelength of the single-wavelength optical radiation and at least one Stokes wavelength.

3. The optical radiation modulation device of claim 2, wherein the first optical fiber comprises a single-mode optical fiber or a multi-mode optical fiber.

4. The optical radiation modulation device of claim 2, wherein the multi-wavelength optical radiation outputted by the first optical fiber is a first multi-wavelength optical radiation;

wherein the second optical fiber is operable to modulate the single-wavelength optical radiation provided or distributed to the second optical fiber to generate a second multi-wavelength optical radiation for output to the second coupler; and wherein the first multi-wavelength optical radiation and the second multi-wavelength optical radiation are different in terms of wavelength composition.

5. The optical radiation modulation device of claim 4, wherein the second optical fiber is operable to generate the second multi-wavelength optical radiation based on stimulated Raman scattering such that wavelengths of the second multi-wavelength optical radiation comprise wavelength of the single-wavelength optical radiation and at least one Stokes wavelength.

6. The optical radiation modulation device of claim 5, wherein wavelengths of the second multi-wavelength optical radiation comprise wavelengths of the first multi-wavelength optical radiation and at least one Stokes wavelength.

7. The optical radiation modulation device of claim 6, wherein the second optical fiber comprises a single-mode optical fiber or a multi-mode optical fiber.

8. The optical radiation modulation device of claim 4, wherein the first optical fiber comprises a single-mode optical fiber or a multi-mode optical fiber operable to generate the first multi-wavelength optical radiation based on stimulated Raman scattering;

wherein the second optical fiber comprises a single-mode optical fiber or a multi-mode optical fiber operable to generate the second multi-wavelength optical radiation based on stimulated Raman scattering; and wherein the first optical fiber and the second optical fiber have different optical path lengths.

9. The optical radiation modulation device of claim 4, wherein the plurality of optical fibers further comprise a third optical fiber operable to modulate the single-wavelength optical radiation provided or distributed to the third optical fiber to generate a third multi-wavelength optical radiation for output to the second coupler; and wherein the first multi-wavelength optical radiation, the second multi-wavelength optical radiation, and the third multi-wavelength optical radiation are different from each other in terms of wavelength composition.

10. The optical radiation modulation device of claim 9, wherein the third optical fiber is operable to generate the third multi-wavelength optical radiation based on stimulated Raman scattering such that wavelengths of the third multi-wavelength optical radiation comprise wavelength of the single-wavelength optical radiation and at least one Stokes wavelength.

11. The optical radiation modulation device of claim 10, wherein the third optical fiber comprises a single-mode optical fiber or a multi-mode optical fiber.

12. The optical radiation modulation device of claim 9, wherein the first optical fiber comprises a single-mode optical fiber or a multi-mode optical fiber operable to generate the first multi-wavelength optical radiation based on stimulated Raman scattering;

wherein the second optical fiber comprises a single-mode optical fiber or a multi-mode optical fiber operable to generate the second multi-wavelength optical radiation based on stimulated Raman scattering; and wherein the third optical fiber comprises a single-mode optical fiber or a multi-mode optical fiber operable to generate the third multi-wavelength optical radiation based on stimulated Raman scattering; and wherein the first optical fiber, the second optical fiber, and the third optical fiber have different optical path lengths.

13. The optical radiation modulation device of claim 1, wherein the second optical fiber is operable to enable passage of the single-wavelength optical radiation provided or distributed to the second optical fiber, without wavelength modification, for output to the second coupler.

14. The optical radiation modulation device of claim 13, wherein the first optical fiber and the second optical fiber have different optical path lengths.

15. The optical radiation modulation device of claim 13, wherein the multi-wavelength optical radiation outputted by the first optical fiber is a first multi-wavelength optical radiation;

wherein the plurality of optical fibers further comprise a third optical fiber operable to modulate the single-wavelength optical radiation provided or distributed to the third optical fiber to generate a second multi-wavelength optical radiation for output to the second coupler; and wherein the first multi-wavelength optical radiation and the second multi-wavelength optical radiation are different in terms of wavelength composition.

16. The optical radiation modulation device of claim 15, wherein the third optical fiber is operable to generate the second multi-wavelength optical radiation based on stimulated Raman scattering such that wavelengths of the second multi-wavelength optical radiation comprise wavelength of the single-wavelength optical radiation and at least one Stokes wavelength.

17. The optical radiation modulation device of claim 16, wherein the third optical fiber comprises a single-mode optical fiber or a multi-mode optical fiber.

18. The optical radiation modulation device of claim 17, wherein the first optical fiber, the second optical fiber, and the third optical fiber have different optical path lengths.

19. The optical radiation modulation device of claim 1, wherein the first coupler comprises a first optical fiber coupler and the second coupler comprises a second optical fiber coupler.

20. The optical radiation modulation device of claim 1, further comprising:

an input coupler optically coupled with the first coupler, the input coupler being configured to couple with an optical radiation generator that is operable to provide the single-wavelength optical radiation.

21. The optical radiation modulation device of claim 1, wherein the optical radiation modulation device is a laser modulation device, the single-wavelength optical radiation is single-wavelength laser, and the multi-wavelength optical radiation is multi-wavelength laser.

22. An optical radiation source for optical or photoacoustic imaging, comprising:

the optical radiation modulation device of claim 1; and an optical radiation generator optically coupled with the optical radiation modulation device and operable to provide the single-wavelength optical radiation to the optical radiation modulation device.

23. The optical radiation source of claim 22, wherein the optical radiation generator comprises a laser generator and the single-wavelength optical radiation comprises single-wavelength laser.

24. The optical radiation source of claim 22, wherein the optical radiation generator comprises a pulsed laser generator and the single-wavelength optical radiation comprises single-wavelength pulsed laser.

25. A device for optical or photoacoustic imaging, comprising:

the optical radiation modulation device of claim 1; and an optical filter arrangement optically coupled with the optical radiation modulation device to remove and/or attenuate one or more wavelengths in the optical radiations outputted by the optical radiation modulation device.

26. The device of claim 25, wherein the device is a probe for optical or photoacoustic imaging.

* * * * *